June 22, 1954  E. J. BRUSELL  2,681,593
OPHTHALMIC MOUNTING
Filed June 11, 1949
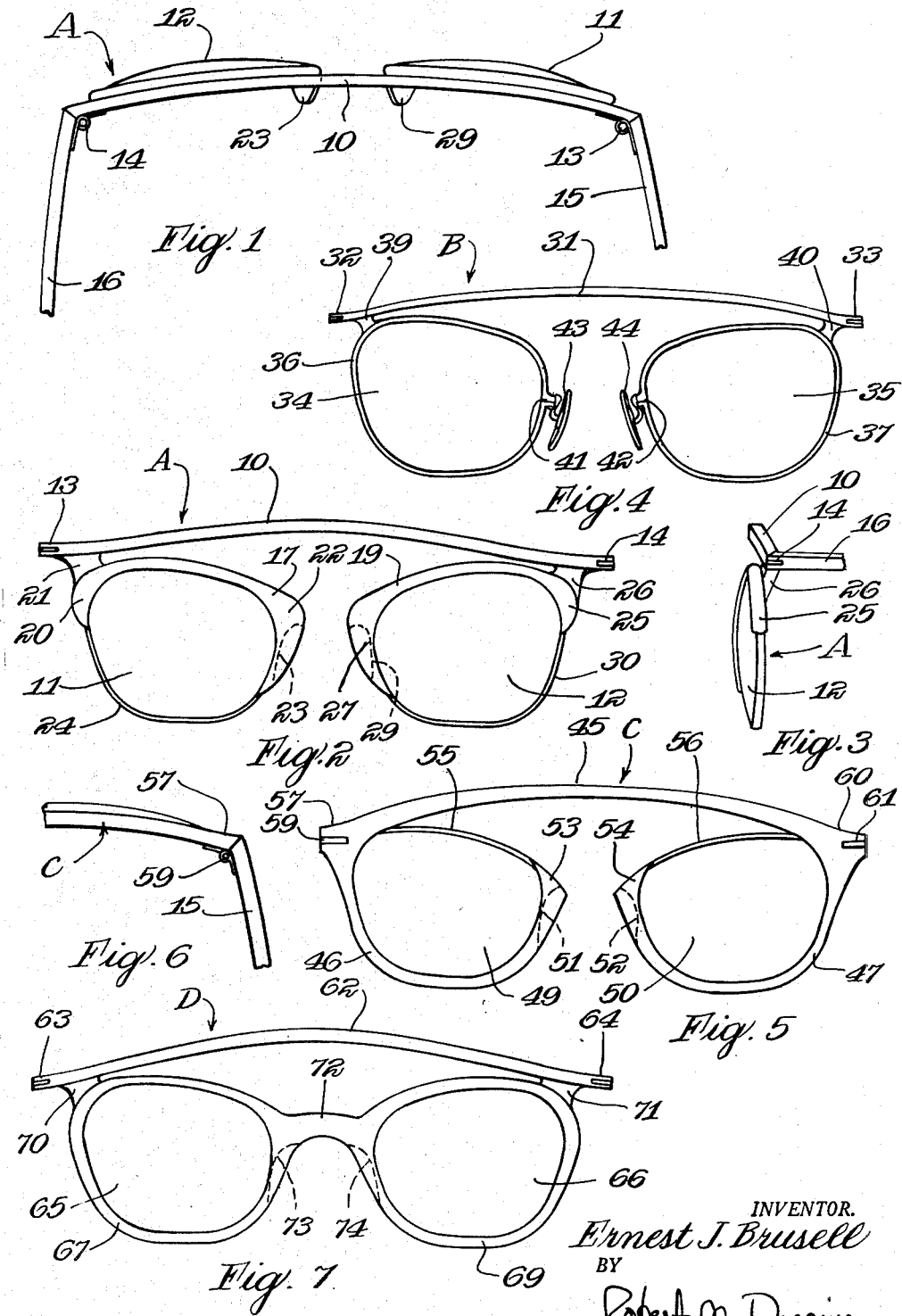
INVENTOR.
Ernest J. Brusell
BY
Robert M. Dunning Patented June 22, 1954

2,681,593

UNITED STATES PATENT OFFICE 2,681,593

OPHTHALMIC MOUNTING

Ernest J. Brusell, St. Paul, Minn.

Application June 11, 1949, Serial No. 98,540

2 Claims. (Cl. 88—41)

My invention relates to an improvement in ophthalmic mounting wherein it is desired to provide a novel means of connecting the lenses thereof.

Numerous constructions have been used in connecting the two lenses of a pair of glasses or spectacles. For the most part the lenses are connected together by a bridge extending between the inner edges of the two lenses. In some instances glasses have been provided with frames connected to the top center portion of the lenses. This type of construction has been used in conjunction with foldable glasses and for connecting auxiliary lenses designed for attachment to eye glasses or spectacles of a conventional type. Most ophthalmic frames partially conceal or largely conceal the eyebrows of the wearer.

An object of the present invention lies in the provision of an ophthalmic mounting which includes a connecting frame member which extends preferably above the level of the lenses and which is connected at the opposite outer ends of the lenses. This connecting frame member is preferably spaced above the upper edges of the lenses to follow the curve of the forehead or to follow the curvature of the eyebrows and is connected with the lenses only near the outer extremities thereof.

A feature of the present invention lies in the provision of a connecting frame member for joining two spaced lenses and which is connected to the lenses or to the frame members wholly or partially encircling the lenses only at the outer extremity of the lenses. As a result the connecting frame member can follow a desired curve or form and may be entirely free of the lenses and their supporting frames between the ends of the connecting member.

A feature of the present invention lies in the provision of an ophthalmic mounting which is connected to the spaced lenses near the upper and outer portions thereof and which may, if desired, serve as a support for the temples. The connecting frame member may if desired extend slightly beyond the outer edges of the lenses and may be hingedly connected to the temples to serve as a support for the glasses.

A feature of the present invention lies in the fact that in the preferred form of my invention the bridge connecting the spaced lenses is eliminated. By supporting the spaced lenses from points near the outer extremity thereof, the lenses and their frames may be supported with a certain amount of resilience which causes the lenses to seat properly against the nose without the use of a relatively rigid connecting bridge extending over the nose. As a result more of the face is visible and the bridge portion of the glasses may be eliminated without changing the general operation of the glasses or spectacles.

A feature of the present invention lies in the fact that my mounting acts to disclose most of the area about the eyes which is concealed by the frames of glasses of more conventional types. For example in horn rim glasses, the rims encircling or partially encircling the lenses and the connecting bridge are usually relatively wide and act to conceal most of the eyebrows and the upper portion of the nose. With my construction the connecting frame member follows the line of the brows at a point spaced substantially above the lenses, leaving an open area between the adjacent lenses and also between the upper edges of the lenses and the connecting frame member. Such a frame is highly advantageous from an appearance standpoint on many types of persons and are often less noticeable when worn.

These and other objects and novel features of my invention will be more clearly and fullly set forth in the following specification and claims.

In the drawings forming a part of my specification:

Figure 1 is a top plan view of an ophthalmic mounting showing the arrangement of parts therein.

Figure 2 is a front elevation view of the mounting shown in Figure 1.

Figure 3 is a side elevation view of the glasses shown in Figure 2.

Figure 4 is a front elevation view of a slightly different form of mounting.

Figure 5 is a front elevation view of another different form of mounting.

Figure 6 is a top plan view of a portion of the mounting shown in Figure 5.

Figure 7 is a front elevation view of one of the forms of construction previously disclosed, but including a bridge portion connecting the spaced lenses frames.

The ophthalmic mounting A illustrated in Figures 1, 2, and 3 of the drawings includes as an essential feature a connecting frame strip 10 which extends preferably above the level of the lenses 11 and 12 and which acts to connect the lenses on their respective frames. The bridge strip 10 as shown in this figure is preferably bowed upwardly in its center, as indicated in Figure 2 of the drawings and is also preferably bowed forwardly as illustrated in Figure 1 of the drawings so as to fit the curvature of the head.

The connecting frame strip 10 is shown in Figure 1 of the drawings as being hingedly connected at 13 and 14 to temples 15 and 16 respectively. These temples 15 and 16 are not shown in any great detail and may be of any desired shape or conformation. The hinges 13 and 14 permit the temples to fold into closed relation substantially parallel to the frame strip 10 when the glasses are not in use.

The mounting A illustrated in Figures 1, 2, and 3 of the drawings is shown as including lens frames 17 and 19 which overlie the upper edges of the lenses 11 and 12 and which are preferably grooved to accommodate the upper lens edges. Lens frames of this general type have been previously employed, although not in a similar combination. The lens frame member 17 is provided with an enlargement 20 at one end thereof which is connected by an upwardly and rearwardly extending web 21 to the frame strip 10 near the hinge 13. The frame member 17 is also provided with an enlarged end portion 22 designed to extend over the inner edge of the lens 11. A nose rest 23 extends rearwardly from the enlargement 22 in the particular construction illustrated. Obviously a separate nose rest may be attached to the frame member 17 if preferred.

Also in the particular style of construction illustrated a narrow band 24 of metal or other suitable material is anchored to the ends 20 and 22 of the lens frame 17 so as to hold the lens 11 in place therein. Obviously the strip 24 which is provided with a grooved inner surface, or which in itself is channel shaped in form, may be eliminated if the lens 11 is attached to the frame member 17 in some other manner.

The lens 12 is similarly mounted. The lens frame 19 includes an enlargement 25 at one end thereof designed to extend over a portion of the outer edge of the lens. This enlargement 25 is connected by a connecting strip or web 26 to the connecting strip 10 near the hinge 14. The opposite end of the lens strip 19 is provided with an enlargement 27 designed to extend along the inner edge of the lens. A nose rest 29 is integrally attached to the enlargement 27 or may be a separate member attached thereto.

A narrow strip or band 30 encircles the lower edge of the lens 12 and is anchored to the opposite ends of the lens frame 19 to hold the lens in place. This lens strip 30 is preferably grooved or channel shaped to accommodate the edge of the lens. The lens strip 30 may be omitted if other means are provided for connecting the lens to the frame 19.

In Figure 4 I disclose a modified form of ophthalmic mounting B which is in general similar to the mounting A. The mounting B includes a frame strip 31 which is upwardly and forwardly bowed somewhat similarly to the strip 10. The ends of the connecting strip 31 are hinged as indicated at 32 and 33 and connect with the temples similar to 15 and 16.

The lenses 34 and 35 may be of any suitable size or shape and are provided with lens encircling frames 36 and 37 respectively. These frames 36 and 37 are connected by upwardly and rearwardly extending connecting webs 39 and 40 to the connecting strip 31 near the hinge points 32 and 33. Thus the lens frames are supported entirely from spaced points 39 and 40 near the opposite ends of the connecting strip 31 and spaced outwardly a substantial distance from the center of the lenses.

The lens frames 36 and 37 are connected together at any suitable points such as 41 and 42 so that the frames may be clamped about the periphery of the lenses. Nose rests 43 and 44 are connected to the frames 36 and 37 so as to support the lenses in proper relation to the bridge of the nose. It will be noted that the individual flexing of the lenses permits them to seat themselves properly upon the nose and to assume a comfortable postiion at all times.

The ophthalmic mounting C illustrated in Figures 5 and 6 of the drawings is similar to the previous mountings in many respects. However, in the form of construction shown in these figures the connecting strip 45 extends directly to the ends of the lens frames 46 and 47 and the connecting webs such as the webs 21 and 26 of the mounting A and the weebs 39 and 40 of the mounting B are eliminated. The connecting frame member 45 bows forwardly in usual practice to fit the curvature of the head and also bows upwardly at its center so as to follow the brow line and to provide a substantial space between the connecting member 45 and the upper edges of the lenses.

The frames 46 and 47 are shown shaped to encircle the lower edges of the lenses 49 and 50 and are grooved to accommodate the lens edge. Nose rests 51 and 52 may be formed integrally with the extremities 53 and 54 of the frames 46 and 47 or may be separate and attached thereto. Thus as contrasted to the construction A in which the frames extend over the upper portion of the lenses, the frames of the lenses extend along the lower and side edges of the lenses.

If desired frame strips 55 and 56 may be connected at opposite ends to the connecting strip 45 near the ends thereof and to the lens frame extremities 53 and 54. These strips 55 and 56 may be grooved to accommodate the upper edges of the lenses 49 and 50 or may be channel shaped in themselves to accommodate these lens edges.

A slight outward projection is provided at the juncture of the connecting strip 45 and the lens frame 46. This projection 57 is connected by a hinge 59 to a suitable temple such as the temple 15 illustrated in Figure 1. A similar projection 60 is provided at the juncture between the connecting strip 45 and the lens frame 47 to accommodate a hinge 61 connecting the mounting to a temple such as 16. The manner in which the temples are connected is believed clearly understood and may be noted in Figure 6 of the drawings.

In the foregoing description I have attempted to show the manner in which my connecting strip may be connected to lenses through frame members of various types. The mounting A shows the connecting strip connected near the opposite outer ends of lens frames which are connected mainly to the lenses along the upper edge thereof. Obviously the lenses could be bolted or otherwise attached to the lens frames, the important feature of the structure residing in the point at which the strip 10 and the lens frames are connected. Similarly in the mounting B, I have shown frames which extend about the entire periphery of the lenses and while these frames are shown as being relatively narrow and probably comprising metallic strips or bands, the important feature of the invention resides in the point of attachment between the lens frames and the cross connecting member 31. Obviously the lens frames do not have to encircle the lenses and may extend if desired along a portion of the peripheral lens surface and bolted or otherwise attached to the lenses. The mounting C of Figures 5 and 6 shows lens frames which are shaped to extend manually about the lower edge of the lenses and while this construction has particular advantages over the other constructions, the specific shape of the frames and the material of which they are made is not of greatest importance. Figure 5 also shows that the temples may be hingedly connected at the juncture between the connecting strip and the lens frames rather than at the free ends of the connecting member as in Figures 1 through 4 of the drawings.

In Figure 7 of the drawings I disclose an ophthalmic mounting D which may comprise any of the previous forms of construction. The mounting D is shown as including a cross connecting member 62. The strip 62 is hingedly connected at its opposite ends 63 and 64 to temples such as those shown in Figure 1. The lenses 65 and 66 are shown encircled by frames 67 and 69 respectively. The frame 67 is connected by a rearwardly and upwardly extending web 70 to the cross connecting member 62 near the hinge 63. Similarly the frame 69 is connected by a rearwardly and upwardly extending web 71 to the cross connecting strip 62 near the hinge 64. Thus it will be noted that the cross connecting member is connected to the lens frames near the outer extremity of these frames.

The unique portion of the mounting D, which differs materially from the previously described modification, lies in the fact that the nose bridge 72 connects the lens frames 67 and 69. Nose rests 73 and 74 are provided on the frames 67 and 69 respectively in any suitable manner.

The construction illustrated in Figure 7 is illustrative of the manner in which a bridge may be used to connect the lens frames. This bridge 72 forms no special advantage, except in holding the lenses more rigidly in predetermined relationship and some of the advantage of my construction is lost when such a bridge is employed. However, the construction still has the advantage of employing a cross connecting member connected to the lenses or lens frames near the outer edges thereof and in providing a member 62 which is spaced above the lenses a distance sufficient to expose portions of the face surrounding the eyes. The cross connecting member 62 is upwardly and forwardly bowed in a manner similar to the previous cross connecting members described.

No ophthalmic mounting is best suited for every type of face and it is probable that my mounting will not add to the appearance of every pair of glasses worn. However, I have found that the use of an upwardly arched connecting strip extending from the outer edge of one lens or lens frame to the outer edge of the other lens or lens frame enhances the appearance of the glasses in a great number of instances. I have also found that this arrangement provides a cushioned support for the lenses and that they may rest upon the bridge of the nose comfortably due to this self-adjusting effect. Furthermore, an open space is provided between the cross frame and the upper lens edges which exposes portions of the face encircling the eyes and renders the connection between the lenses less prominent. The upwardly and forwardly bowed connecting member presents an unusual and attractive appearance on many persons and is of structural advantage as well as of advantage from a design or appearance standpoint.

In accordance with the patent statutes, I have described the principles of construction and operation of my ophthalmic mounting, and while I have endeavored to set forth the best embodiments thereof, I desire to have it understood that obvious changes may be made within the scope of the following claims without departing from the spirit of my invention.

I claim:

1. An ophthalmic mounting including a cross connecting member comprising an elongated upwardly and outwardly bowed frame member of unitary flexible construction, a pair of spaced lenses, supporting means connected to the upper and outer extremities of said lenses and rearwardly and upwardly directed webs extending from said lens supporting means to the extremities of said cross connecting member, spacing said cross connecting member above and to the rear of said lens supports said webs being located adjacent to the outermost edges of the lenses.

2. The structure described in claim 1 and including a bridge connecting said lenses.

References Cited in the file of this patent

UNITED STATES PATENTS

| Number | Name | Date |
|---|---|---|
| D. 67,790 | Chiasson | July 14, 1925 |
| D. 92,318 | Reynolds | May 22, 1934 |
| D. 118,713 | Reynolds | Jan. 30, 1940 |
| D. 152,222 | Smart | Dec. 28, 1948 |
| 1,663,402 | Engel | Mar. 20, 1928 |
| 2,004,445 | Meyer | June 11, 1935 |
| 2,176,590 | Kirk et al. | Oct. 17, 1939 |
| 2,322,993 | Zell | June 29, 1943 |
| 2,326,846 | Fair | Aug. 17, 1943 |
| 2,329,100 | Chappell | Sept. 7, 1943 |
| 2,356,148 | Cozzens et al. | Aug. 22, 1944 |
| 2,447,936 | Ellis | Aug. 24, 1948 |